United States Patent [19]

Guerrero

[11] Patent Number: 4,826,217
[45] Date of Patent: May 2, 1989

[54] APPARATUS AND METHOD FOR SEALING A TUBE JOINT

[75] Inventor: Hector N. Guerrero, Simsbury, Conn.

[73] Assignee: Combustion Engineering, Inc., Windsor, Conn.

[21] Appl. No.: 846,020

[22] Filed: Mar. 31, 1986

[51] Int. Cl.$^4$ .................... F16J 15/06; F16L 5/02; F16L 19/06

[52] U.S. Cl. ........................................ 285/158; 525.1; 219/69.17; 220/465; 277/1; 277/4; 277/103; 277/110; 285/332.3; 285/348; 285/351; 285/356; 376/204; 376/260; 376/292

[58] Field of Search ............... 376/203, 204, 277, 292, 376/293, 287; 219/69 R, 69 M; 285/9.2, 348, 356, 112, 158, 351, 341, 332.3; 277/1, 4, 9, 190, 110, 193, 112, 105, 106, 123, 102, 103, 58, 60; 220/465; 29/455 R, 526 R

[56] References Cited

U.S. PATENT DOCUMENTS

| | | | |
|---|---|---|---|
| 2,028,182 | 1/1936 | Barnickol, Jr. | 285/112 |
| 2,071,825 | 2/1937 | Finlayson | 277/105 |
| 2,110,098 | 3/1928 | Strecker | 277/123 X |
| 2,394,609 | 2/1946 | Hardesty | 285/348 |
| 2,471,658 | 5/1949 | Shaffer et al. | 277/123 |
| 2,652,443 | 9/1953 | Bosworth | 285/356 X |
| 2,719,737 | 10/1955 | Fletcher | 277/123 X |
| 2,749,154 | 6/1956 | Smith | 285/356 X |
| 2,885,227 | 5/1959 | Burger | 277/9 |
| 3,261,611 | 7/1966 | Maidment . | |
| 3,351,350 | 11/1967 | Shepler | 277/105 X |
| 3,577,833 | 5/1971 | Skelton | 277/102 X |
| 3,778,881 | 12/1973 | Knapp | 277/9 X |
| 3,841,667 | 10/1974 | Sands | 285/220 X |
| 4,252,348 | 2/1981 | Kojima | 285/158 |
| 4,440,339 | 4/1984 | Tamai et al. . | |
| 4,451,047 | 5/1984 | Herd et al. | 277/123 X |
| 4,480,841 | 11/1984 | Schnkei et al. | 277/190 X |
| 4,573,496 | 3/1986 | Richard | 219/69 R |
| 4,601,872 | 7/1986 | Yada et al. . | |
| 4,611,813 | 9/1986 | Guerrero | 277/190 X |

FOREIGN PATENT DOCUMENTS

0164524 12/1985 European Pat. Off. .
2039634 8/1980 United Kingdom ............... 277/105

*Primary Examiner*—Allan N. Shoap
*Attorney, Agent, or Firm*—Chilton, Alix & Van Kirk

[57] ABSTRACT

A joint between a pair of coaxial tubes which extend into a pressure vessel from a surface is sealed using a sleeve-like housing which surrounds the joint to be sealed. An upper fluid-tight seal is formed between the longer of the tubes and the housing. A lower fluid-tight seal is formed between the housing and the surface. An intermediate seal is also formed between the housing and the shorter tube. The upper and lower seals are independently preloaded through the use of spring washers. Primary loading of the lower seal to the surface is caused by fluid pressure in the vessel which acts on the housing.

20 Claims, 2 Drawing Sheets

APPARATUS AND METHOD FOR SEALING A TUBE JOINT

BACKGROUND OF THE INVENTION

(1) Field of the Invention

The present invention is directed to the establishment of a fluid-tight seal between a pair of coaxial tubular members of unequal length and/or between a tubular member and a surface from which it extends. More particularly, this invention relates to apparatus for sealing a nozzle tube to a stub tube and/or to the wall of a nuclear reactor pressure vessel. Accordingly, the general objects of the present invention are to provide novel and improved methods and apparatus of such character.

(2) Description of the Prior Art

In boiling water nuclear reactors, control rods are driven upwardly through nozzles disposed in the lower portion of the reactor pressure vessel. The "nozzles" are supported by and are longer than stub tubes which are welded to the interior wall of the reactor vessel. Each "nozzle" is sealed to its associated stub tube by means of an annular weld between the "nozzle" and the stub tube upper end.

During the operation of a boiling water reactor, a crack may develop in a stub tube or in one of the weld zones. Such a crack may permit the leakage of coolant into the annular space about the control rod nozzle. Because of the high pressure within the interior of the reactor vessel, even a very small crack could result in radioactive fluid passing to the exterior of the reactor vessel via this annular space. It is necessary that any such leakage be halted so that the nuclear reactor may continue to operate.

The repair of leaks which occur in the stub tube area of a reactor are complicated by the radioactive environment as well as by the location of the stub tube at the bottom of the reactor vessel generally underneath the reactor core with its fuel assemblies. The initial prior art method of repairing a failed stub tube member involves removing some or all of the reactor fuel assemblies, completely draining the coolant from reactor vessel and then either replacing or repairing the stub tube member This is an expensive and time consuming procedure.

In U.S. Pat. No. 4,480,841 entitled "Apparatus and Method for Sealing a Tube Joint", which is assigned to the assignee of the present invention, a mechanism for establishing a seal about the welded joint between a tube stub and a "nozzle" is disclosed. This mechanism allows for remote repair of a failed joint. In the apparatus of U.S. Pat. No. 4,480,841, a sleeve fits closely over the joint. A housing surrounds the sleeve and a thrust ring acts to compress packing rings against the sleeve and both the tube stub and nozzle to form a fluid tight seal around the joint. A sealing nut is employed to maintain the compression of the packing seals. The apparatus and method of U.S. Pat. No. 4,480,841 is designed to rectify cracks which occur in the area of the weld which forms the joint between the stub tube and the nozzle tube. However, cracks may form in the stub tube below the bond to the nozzle and in the region where the stub tube is welded to the vessel. The prior art has not addressed the problem of expediciously repairing cracks which occur below the joint between the stub tube and its associated control rod nozzle.

SUMMARY OF THE INVENTION

The present invention overcomes the above-discussed and other deficiencies of the prior art by providing a novel and improved method and apparatus which may be employed to repair leaks which occur at any point along the length of a stub tube of a reactor pressure vessel control rod nozzle assembly. Briefly stated, the invention in a preferred form comprises apparatus for repairing leaks which occur between coaxial tubes which extend from a surface such as the inner wall of a reactor vessel. The apparatus comprises a substantially sleeve-like housing which is adapted to surround the region to be sealed. The housing has a lower section adapted to fit closely around the first tube and a generally annular shaped lower end which substantially conforms to the configuration of the surface from which the first tube extends. A lower seal is disposed between the housing lower end and the surface to form a fluid-tight seal therebetween. A sleeve is slidably received in the housing. The sleeve has an upper section which fits closely around the second tube and defines an inwardly extending shoulder. An upper seal is positioned on this shoulder. A thrust ring is disposed above and acts on the upper seal. A nut engages the housing and urges the thrust ring into engagement with the upper seal to compress the seal and establish a fluid tight joint between the sleeve and the second tube. A second nut engages the second tube for urging the housing toward the surface whereby both the upper and lower seals are compressed into sealing engagement with the respective second tube and the surface to form a fluid-tight joint about the first tube.

The housing also has a shoulder which extends toward the tubes. The lower end of the sleeve forms another shoulder which is disposed oppositely with respect to the shoulder on the housing. An intermediate seal is disposed between the housing shoulder and the sleeve lower end and engages the exterior of the first tube upon application of compressive force to the intermediate seal via the sleeve.

In one embodiment of the invention, a clamp engages the first and second tubes. The clamp is interposed between the housing and the tubes to clamp the tubes together. The clamp includes a pair of inwardly protruding rims which engage cooperating grooves in the exteriors of the tubes.

In the practice of the present invention, a sleeve-like housing is positioned so as to surround a pair of coaxial tubes of unequal length which extend from a surface. An upper seal ring is compressed to provide a seal between the longer tube and the housing. The lower end of the housing is sealed against the surface by torquing a nut which is threaded to the second tube.

An object of the invention is to provide a new and improved method and apparatus for sealing the joint between substantially co-linear tubes.

Another object of the invention is to provide a new and improved method and apparatus which is adaptable for sealing cracks located at any level along an extended region of the stub tube of a vertically oriented reactor vessel control rod nozzle tube assembly.

Yet another object of the invention is to provide a new and improved apparatus for repairing cracked tubes and an associated method wherein stresses on the cracks are minimized during the repair process.

A further object of the invention is to provide a new and improved method and apparatus for establishing a seal which implements a substantially uniform sealing pressure across a sealing interface.

A still further object of the invention is to provide a new and improved method and apparatus for reestablishing a seal between a pair of coaxial tubes to compensate for the formation of a crack in one of the tubes.

Other objects and advantages of the invention will become apparent from the drawing and the specification.

DETAILED DESCRIPTION OF THE INVENTION

Figure 1:
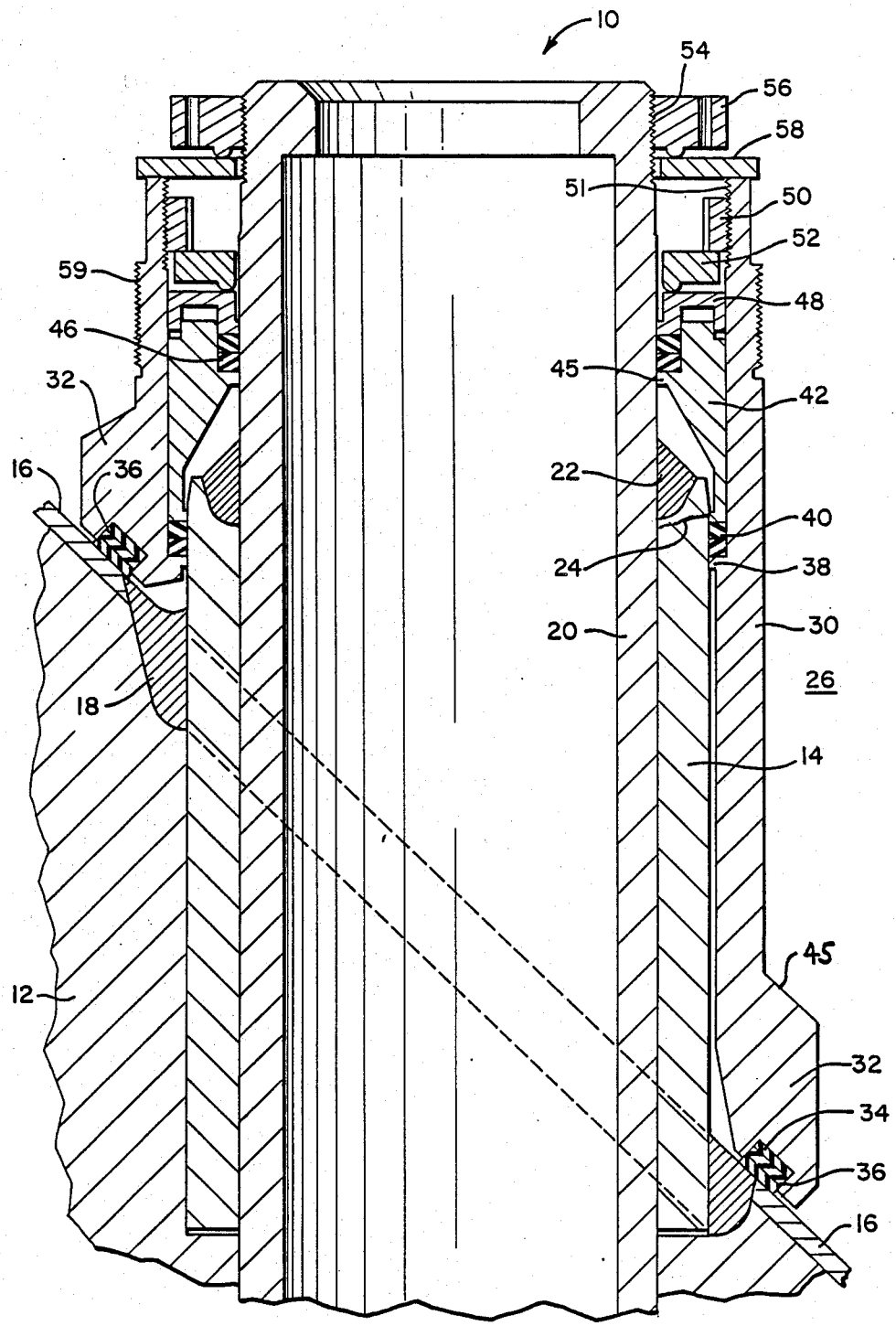
FIG. 1 is a cross-sectional view of apparatus in accordance with a first embodiment of the present invention installed on a leaking control rod nozzle arrangement in a boiling water reactor.

With reference to the drawing, wherein like numerals represent like parts in the two figures, one embodiment of a sealing apparatus in accordance with the present invention is generally designated by the numeral 10 in FIG. 1. The sealing apparatus 10 is shown installed in a nuclear reactor vessel 12. A stub tube 14 extends upwardly at the interior of the reactor vessel. A circumferential weld 18 which will customarily be a two phase penetration weld, secures the stub tube in position relative to the vessel wall. Stub tube 14 surrounds and is coaxial with a nozzle tube 20 with the stub and nozzle tubes being joined by a welded joint 22. The nozzle tube 20 guides a control rod which passes upwardly into the reactor core (not illustrated). The axis of tubes 14 and 20 is oriented at an oblique angle relative to the interior surface of the reacotr vessel, the inner wall of the vessel 12 being covered by a stainless steel cladding 16. The reactor vessel bottom interior shape is typically in the form of a portion of a hemisphere.

Apparatus 10 is installed to seal a crack 24 which in the illustration of FIG. 1 is located just below the weld 22. It will be appreciated that without the installation of apparatus 10, during the operation of the nuclear reactor, highly pressurized coolant from the interior 26 of the reactor vessel would tend to leak through crack 24 and flow downwardly through the annulus between the nozzle tube 20 and the stub tube 14 to escape to the exterior of the reactor vessel. The coolant may be radioactive and, consequently, the leaked fluid may be hazardous to personnel and equipment.

In addition to the hazard posed by accidental release of radioactive liquid, the repair of the leakage as previously described is complicated by the location of the nozzle tube assemblies in the lower portion of the reactor vessel underneath the fuel assemblies. To repair the crack 24 by replacing or repairing the stub tube 14 would require the removal of at least a sizeable number of the nuclear fuel assemblies and associated support structure from the reactor vessel and the complete draining of the reactor coolant to provide the required access to the stub tube. Furthermore, the interior of the reactor vessel would still be radioactive, thus making the work environment for the repair hazardous to personnel.

In accordance with the present invention, the sealing apparatus 10 may be remotely installed over the leaking nozzle tube assembly without requiring the extensive removal of fuel assemblies and associated structures and without draining the coolant from the reactor vessel. The apparatus 10 may be efficiently installed to provide a fluid-tight seal between the stub tube/nozzle tube assembly with the seal having a high degree of sealing integrity.

Assembly 10 comprises an outer housing 30 which surrounds the stub tube/nozzle tube assembly and is generally coaxial therewith. The lower end of housing 30 defines an outwardly flaring enlarged rim portion 32. Rim portion 32 is configured so that the lower end thereof conforms generally to the contour of the interior surface of the vessel. A groove 34 is formed in the end of rim portion 32 for receiving a lower packing ring 36. The lower packing ring 36 is thus disposed between the housing 30 and the vessel wall to provide a fluid-tight seal therebetween upon the urging of the housing 30 in a axially downward direction against the vessel wall.

In order to enhance the seal provided by the lower packing ring 36 the cladding 16 on the vessel wall surface is preferably smoothed by electrical discharge machining. For this purpose a cylindrical graphite electrode mounted to an electrical discharge machine head is fitted concentrically over the stub tube 14. The cladding will preferrably be machined so as to define either an elliptical groove or an annular flat surface of elliptical shape which does not depart significantly from the large radius spherical shape of the reactor vessel. The machined surface of the vessel wall will be substantially an exact duplicate of the electrode surface. The smooth sealing surface is formed on the cladding without any penetration into the carbon steel parent metal of the vessel.

An integral transverse shoulder 38 projects inwardly from the housing as shown. Shoulder 38 closely approaches, and preferably loosely circumferentially engages, the exterior surface of the stub tube 14. Shoulder 38 functions to provide a lower support for an intermediate packing ring 40. In the apparatus illustrated in FIG. 1, packing ring 40 is positioned on shoulder 38 and disposed slightly below crack 24.

A sleeve 42 is slidably received within the housing 30 and is dimensioned and configured at the lower end to form a shoulder which is adapted for compressive engagement against intermediate packing ring 40. An inner intermediate transversely extending shoulder 45 of sleeve 42 closely surrounds the exterior surface of nozzle tube 20 and forms a lower support for an upper packing ring 46. Upper packing ring 46 is seated on shoulder 45 and, upon delivery of a compressive force thereto in the manner to be described below, expands radially to sealingly engage nozzle tube 20 to provide a fluid-tight seal between the nozzle tube and sleeve 42.

A flexible steel thrust ring 48 is interposed between the housing and the nozzle tube. Ring 48 engages the top of the upper packing ring 46. Thrust ring 48 cooperates with the sleeve 42 for applying a compressive force to the upper packing ring 46. Downward force applied to thrust ring 48 is also axially transmitted via sleeve 42 to intermediate packing ring 40. An externally threaded nut 50 engages the threaded upper inner portion 51 of housing 30. Nut 50 is coupled to thrust ring 48 by Belleville washer 52. Washer 52 thus resiliently and uniformly urges the thrust ring into compressive engagement with upper packing ring 46 with the compressive force being a function of the position of nut 50 relative to the upper end of housing 30.

The nozzle tube 20 has a threaded exterior surface 54 which is engaged by a nut 56. Nut 56 is disposed above housing 30 and engages the top of a second Belleville washer 58 which is interposed between the nut and the upper end of the housing 30. Nut 56 is positioned to axially force the housing against the pressure vessel to thereby resiliently load the lower packing ring 36.

Housing 30 is provided with a threaded external surface 59 for engagement by an installation tool as described hereinafter. It will be appreciated that when nuts 50 and 56 are positioned to apply suficient compressive loading to the upper packing ring 46, the intermediate packing ring 40 and lower packing ring 36, a fluid-tight sealing arrangement is established wherein the nozzle tube is sealed to the pressure vessel wall to prevent the leakage of coolant from the vessel interior via crack 24 to the vessel exterior.

The packing rings 36, 40 and 46 are preferably formed from "Grafoil" and are multilayer devices. However, the packing rings may be formed from any of a multiplicity of compressable sealing materials such as pure graphite. metal seals, curable resins or the like. The selected seal materials must be capable of retaining their physical characteristics when subjected to long term radiation if apparatus 10 is to be employed in the illustrated reactor vessel environment. The packing rings 36, 40, and 46 are continuous sealing elements, i.e., they need not be of a split ring form. The elliptical packing ring 36 may be formed from multiple flat layers of packing material.

The above-described sealing apparatus 10 is installed by concentrically slipping the housing over a stub tube/nozzle tube assembly which has been identified as having a leaking joint resulting from a crack in the stub tube or its upper or lower welds. The upper seal is preloaded by means of an installation tool (not illustrated) such as disclosed in U.S. Pat. No. 4,480,841, the description of which tool is incorporated herein by reference. The installation tool comprises three concentric tubes. The outermost tube is engaged with the treaded surface 59 of the housing to support the tool during the installation process. The innermost tube of the installation tool is dimensioned to slide between the nozzle tube 20 and the nut 50 for engaging the top of the thrust ring 48. Nut 56 and spring washer 58 are not mounted during the pre-loading of the upper seal. The upper and intermediate packing rings are compressed to establish the desired seals by exerting an upward axial force on the outermost tube of the tool and a downward axial force on the innermost tube of the installation tool. The intermediate tube of the installation tool then causes capture of the upper and intermediate seals in the compressed states by engaging the nut 50 and torquing the intermediate tube until nut 50 is axially positioned to apply the requisite compressive force to thrust ring 48 via washer 52. The forces on the innermost and outermost tubes of the installation tool are then released and the installation tool is disengaged from the sealing apparatus 10.

The lower packing ring 36 is thereafter preloaded by torquing the sealing nut 56 against the spring washer 58 at the top of the housing until sufficient pressure is provided to insure a good seal under vessel low pressure conditions. Thus, the Belleville washers 52 and 58 insure against leakage under low pressure conditions. During the process of preloading the lower packing seals, the upper ring 46 and the intermediate ring 40 will slide down the respective nozzle tube and stub tube surfaces since the coefficient of friction of the preferred "Grafoil" packing is relatively low. However, the seals still maintain a fluid-tight seal of a high degree of integrity. It will be appreciated that the above-described process permits remotely controlled installation of apparatus 10 through a narrow access channel (not illustrated). The access channel may be formed by removing only those nuclear fuel assemblies located above the leaking stub tube in the reactor core. The required diameter of such a channel is only slightly greater than the outside diameter of the sealing apparatus 10. It may also be advantageous to introduce an inert gas, such as nitrogen, locally during the installation in order to temporarily drive away the surrounding reactor coolant.

The intermediate packing ring 40 essentially functions as a centering support for the sleeve housing 30 on the stub tube 14 to minimize the possibility of further cracking of the tube 20 during the installation and sealing process. Because of the asymmetrical loading resulting from the action of the reactor coolant on the sleeve housing, the housing 30 has a tendacy to slide upwardly along the inclined vessel wall surface. Any such sliding movement could result in the loss of sealing and could stress stub tube 14 thus causing an extension of the crack. The intermediate packing ring 40 resists the asymmetric loading by functioning as an intermediate support structure. It is also to be noted that housing 30 is configured such that during reactor operation there will be a pressure differential, resulting from the surface areas 45 of apparatus 10 which are exposed to the pressurized vessel coolant, which causes seating of the lower packing ring 36. Restated, the present invention primarily relies upon the reactor internal pressure to generate a downward, i.e., a seating force on the lower seal 36 during reactor operation. This self-actuating characteristic or reliance on forces produced as a result of the coolant pressure to insure the integrity of the lower seal has the added advantage of minimizing the mechanical preloading forces which must be applied. The preloading of seal 36 puts stress on the crack because it urges nozzle tube 20 in the upward direction and, accordingly, is preferably minimized. In instances (not illustrated) wherein the crack is sufficiently axially spaced from the weld 22, the intermediate packing ring 40 actually does not, because of the axial location of the packing ring 40 in relation to the crack, perform a requisite sealing function but rather functions primarily as a centering support structure.

Figure 2:
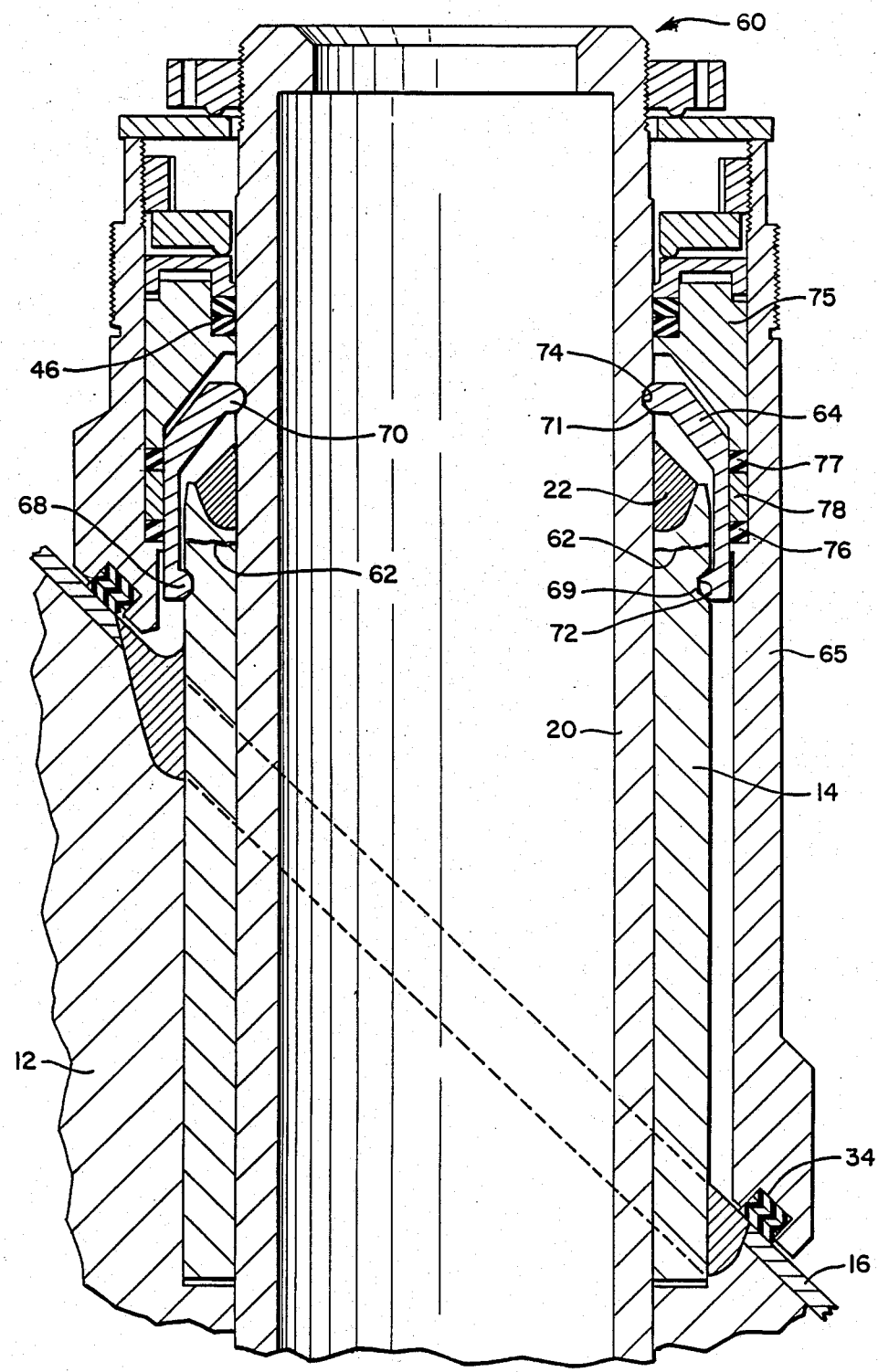
FIG. 2 is a cross-sectional view of a second embodiment of apparatus in accordance with the present invention installed on a leaking control rod nozzle arrangement in a boiling water reactor.

With reference to FIG. 2, a second embodiment of a seal apparatus in accordance with the present invention is generally designated by the numeral 60. The apparatus of FIG. 2 is particularly well suited to employment in a case where the crack 62 in the stub tube 14 essentially extends 360 degrees. When the crack 62 extends completely about the stub tube 14, additional structural problems are presented with respect to installation of apparatus 60 and corrective sealing of the stub tube/nozzle tube assembly. Except for the modifications described hereinafter seal apparatus 60 is substantially identical in form and function to apparatus 10 of the embodiment of FIG. 1.

A stub tube clamp 64 is interposed between the stub tube/nozzle tube assembly and the housing 65. Clamp 64 forces the portions of the stub tube disposed above and below the crack together to enhance the structural and sealing integrity of the installed sealing apparatus.

Housing 65 is substantially identical to housing 30 except for the diametral dimensional constraints resulting from the addition of clamp 64 as hereinafter described. Stub tube clamp 64, in a preferred form, consists of two separate half sections which form a generally cylindrically-shaped sleeve having a degree of resiliency. Each of the clamp sections includes spaced, inwardly extending ring protrusions 68 and 70 which are partially defined by respective inclined surfaces or bevels 69 and 71. Grooves 72 and 74 are respectively formed on the stub tube and nozzle tube exterior surfaces for receiving respective of protrusions 68 and 70, the grooves being complementary in shape to the protrusions.

The clamp sections are initially installed on the stub tube 14 by a pin and hinge attachment (not illustrated). The remainder of the mechanical sealing apparatus 60 is then positioned over the stub tube/clamp assembly as illustrated in FIG. 2. The clamp 64 has a uniform outside diameter which allows the clamp to fit against the lower inner surface of the sleeve 75. The outer surface of the clamp functions as a sealing surface for a pair of packing rings 76 and 77. The packing rings are interposed between shoulder 38 of the housing and shoulder 44 of the sleeve 75. Sleeve 75 is dimensioned to accommodate clamp 64 and is otherwise identical in form and function to sleeve 42. A spacer ring 78 separates the packing rings 76 and 77.

Upon the application of compressive force against the thrust ring 48 by the installation tool as previously described, the clamp 64 is caused to engage the groove 74 of the nozzle tube and groove 72 of the stub tube to provide a mechanical connection between the tube 14 portions on opposing sides of crack 62 via weld 22 and tube 20. The packing rings 76 and 77 urge the clamp 64 radially inwardly to enhance this mechanical connection. The inclined surfaces 69 and 71 of the clamp protrusions cooperate with complementary inclined surfaces of grooves 72 and 74 to resiliently bias the tube portions on opposing sides of the crack 62 together. It will be appreciated that the control rod drive housing or nozzle tube may not be forced upwardly because of the locking action of the clamp. The remainder of the apparatus 60 functions and is installed as previously described for apparatus 10.

In an alternate form of the invention, the engagement portions of clamp 64 may have gripping teeth (not illustrated) which engage the stub tube and the nozzle tube exterior surfaces. In the latter embodiment, sufficient space is required on the stub tube and the nozzle tube to incorporate relatively large bearing areas for the teeth.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. Apparatus for sealing a joint between coaxial first and second tubes which extend into a pressure vessel through a reference surface on the interior of the vessel, the second tube passing through and having a length in the extension direction which is greater than that of the first tube, the axes of said tubes being oriented at an angle with respect to said reference surface, said sealing apparatus comprising:
   a substantially sleeve-like housing adapted to surround the joint to be sealed, said housing being sized and shaped to receive said first tube and having a lower end which generally conforms to the reference surface, at least a portion of the exterior of said housing forming a reaction surface;
   lower seal means adapted for disposition between said housing lower end and said reference surface for forming a seal therebetween;
   a sleeve slidably received in said housing, said sleeve fitting closely around said second tube, said sleeve defining a sleeve first shoulder above the joint which extends transversely with respect to said axes;
   upper seal means mounted on said first shoulder for forming a seal between the second tube and said sleeve when compressed;
   means for applying a compressive force to said upper seal means; and
   preloading means coupled to the second tube for generating a force on said housing to urge said housing toward the reference surface whereby said lower seal means is compressed against the reference surface, said lower seal means being further activated for sealing engagement against the reference surface by the differential force acting on the reaction surface as a result of the internal pressurization of the vessel.

2. The apparatus of claim 1 wherein said housing further includes a transverse housing shoulder on the interior of said housing adjacent said first tube, said sleeve defines a sleeve second shoulder adjacent the first tube and axially spaced above said housing shoulder, and an intermediate seal means interposed between said housing shoulder and said sleeve second shoulder, said intermediate seal engaging the first tube upon application of a force to said sleeve by said compressive force applying means.

3. The apparatus of claim 1 wherein said housing includes a threaded surface formed at an upper interior portion thereof and said compressive force applying means comprises a nut threadably engageable with said housing threaded surface for axial positioning relative to said housing.

4. The apparatus of claim 1 wherein said compressive force applying means comprises a thrust ring having a lower surface which engages said upper seal means and a spring washer for applying force to said thrust ring.

5. The apparatus of claim 1 wherein the second tube includes a circumferentially extending threaded surface and said preloading means comprises a nut threadably engageable with the second tube threaded surface and a spring washer which engages an upper end of said housing, said nut being axially positionable relative to the second tube to engage said spring washer whereby said washer urges said housing toward said reference surface with a preload force.

6. The apparatus of claim 5 wherein said compressive force applying means comprises a thrust ring having a lower surface which engages said upper seal means and a second spring washer for applying force to said thrust ring.

7. The apparatus of claim 6 wherein said housing further comprises a transverse housing shoulder on the interior of said housing adjacent said first tube, said sleeve defines a sleeve second shoulder adjacent the first tube and axially spaced above said housing shoulder, and an intermediate seal means interposed between said housing shoulder and said sleeve second shoulder, said intermediate seal engaging the first tube upon application of a force to said sleeve by said second spring washer.

8. The apparatus of claim 7 wherein said housing includes a threaded surface formed at an upper interior portion thereof and said compressive force applying means further comprises a nut threadably engageable with said housing threaded surface for axial positioning relative to said housing, said nut engaging said thrust ring.

9. The apparatus of claim 1 wherein the angle is an oblique angle and said housing lower end forms a generally elliptical shaped end groove, said lower seal means comprising a sealing member received in said lower end groove.

10. Apparatus for sealing a joint between coaxial first and second tubes which extend into a pressure vessel through a reference surface on the interior of the vessel, the second tube passing through and having a length in the extension direction which is greater than that of the first tube, the axes of said tubes being oriented at an angle with respect to said reference surface, said sealing apparatus comprising:
  a substantially sleeve-like housing adapted to surround the joint to be sealed, said housing being sized and shaped to receive said first tube and having a lower end which generally conforms to the reference surface, at least a portion of the exterior of said housing forming a reaction surface;
  lower seal means adapted for disposition between said housing lower end and said reference surface for forming a seal therebetween;
  a sleeve slidably received in said housing, said sleeve fitting closely around said second tube, said sleeve defining a sleeve first shoulder above the joint which extends transversely with respect to said axes;
  upper seal means mounted on said first shoulder for forming a seal between the second tube and said sleeve when compressed;
  means for applying a compressive force to said upper seal means;
  a clamp member spanning the joint and engageable with the first tube and the second tube and interposed between said housing a said tubes to clamp said tubes together as said compressive force is applied to said upper seal means; and
  preloading means which cooperates with the second tube for generating a force for urging said housing toward the reference surface whereby said lower seal means is compressed against the reference surface, said lower seal means being further activated for sealing engagement against the reference surface by the differential force acting on the reaction surface as a result of the internal pressurization of the vessel.

11. The apparatus of claim 10 wherein each of the tubes has a circumferentially extending groove and said clamp member further comprises a pair of spaced protrusions which respectively engage said grooves.

12. The apparatus of claim 10 wherein said housing further comprises an inner transverse housing shoulder adjacent the first tube and said apparatus further comprises an intermediate seal ring interposed between said housing shoulder and the sleeve and adapted to force said clamp member radially inwardly into clamping engagement with the tubes in response to compression of said intermediate seal ring by said means for applying a compressive force.

13. A method for sealing a joint between substantially coaxial first and second tubes which extend from a surface, the second tube passing within the first tube and extending a greater distance from the surface, comprising the steps of:
  installing a substantially sleeve-like housing about the tubes to cover the joint to be sealed, the lower end of the housing generally conforming to the surface, a first seal being disposed between the lower end of the housing and the surface;
  installing a sleeve within and axially slidable relative to the housing, the sleeve extending above the joint;
  installing a second seal between the sleeve and the second tube above the joint;
  applying a compressive force to the second seal; and
  applying another force between the second tube and the housing to preload the first seal against the surface, the other force being independent of the compressive force.

14. The method of claim 13 further comprising the step of machining the surface to form a smooth sealing surface.

15. The method of claim 13 wherein the step of applying a compressive force comprises applying a spring bias to the second seal by adjusting the position of a thrust generator relative to the housing.

16. The method of claim 13 wherein the step of preloading comprises:
  mechanically coupling the longer of the tubes to the housing, and applying a spring bias between the housing and the longer tube.

17. The method of claim 13 further comprising the step of establishing an intermediate seal between the interior of the housing and the exterior of the shorter of the tubes.

18. The method of claim 13 further comprising the step of clamping the first tube to the second tube.

19. The method of claim 16 wherein the step of applying a compressive force comprises applying a spring bias to the second seal by adjusting the position of a thrust generator relative to the housing.

20. The method of claim 19 further comprising the step of clamping the first tube to the second tube.

* * * * *